US009680519B2

(12) United States Patent
Fathollahi

(10) Patent No.: US 9,680,519 B2
(45) Date of Patent: *Jun. 13, 2017

(54) PROTECTIVE CASE FOR MOBILE DEVICE WITH INTEGRATED LATCH

(71) Applicant: Incipio, LLC, Irvine, CA (US)

(72) Inventor: Andy Fathollahi, Corona Del Mar, CA (US)

(73) Assignee: Incipio, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,502

(22) Filed: Aug. 15, 2016

(65) Prior Publication Data

US 2016/0359516 A1    Dec. 8, 2016

Related U.S. Application Data

(63) Continuation of application No. 14/590,975, filed on Jan. 6, 2016, now Pat. No. 9,419,670.

(Continued)

(51) Int. Cl.
*H04M 1/00* (2006.01)
*H04B 1/3888* (2015.01)
(Continued)

(52) U.S. Cl.
CPC ............ *H04B 1/3888* (2013.01); *A45C 11/00* (2013.01); *G06F 1/1626* (2013.01);
(Continued)

(58) Field of Classification Search
CPC ..................................................... H04B 1/3888
(Continued)

(56) References Cited

U.S. PATENT DOCUMENTS 8,573,394 B2 * 11/2013 Ahee ..................... G06F 1/1626
16/366
8,717,319 B2 * 5/2014 Wu ........................ G06F 1/1632
206/320

(Continued)

OTHER PUBLICATIONS

Nick Guy, "Review: Incipio Steno Ultra-Thin Bluetooth Keyboard Folio for iPad Air," Jul. 14, 2014, http://www.ilounge.com/index.php/reviews/entry/incipio-steno-ultra-thin-bluetooth-keyboard-folio-for-ipad-air.

(Continued)

*Primary Examiner* — Santiago Garcia
(74) *Attorney, Agent, or Firm* — Manatt, Phelps & Phillips, LLP

(57) ABSTRACT

A protective case for a mobile device is disclosed. The protective case includes a front cover, a back cover, and a relatively rigid shell. The front cover includes multiple fold lines that extend across the cover and allow adjacent regions of the cover to rotate or move relative to each other. The shell is configured to receive and retain the mobile device while providing user access to the mobile device. The shell has an outer surface configured to include a latch with an integrated hook. In operation, the latch hooks and retains one end section of the front cover to maintain the device in an angled use position when open. When in the fully closed position the latch fits within an aperture defined within a back end region of the front cover. Magnets incorporated into the front cover assist in maintaining the case in the fully closed position.

18 Claims, 9 Drawing Sheets

Related U.S. Application Data

(60) Provisional application No. 61/924,695, filed on Jan. 7, 2014.

(51) Int. Cl.
  *H04B 1/3877* (2015.01)
  *H04M 1/04* (2006.01)
  *G06F 1/16* (2006.01)
  *A45C 11/00* (2006.01)

(52) U.S. Cl.
  CPC ............ *H04B 1/3877* (2013.01); *H04M 1/04* (2013.01); *A45C 2011/003* (2013.01); *A45C 2200/15* (2013.01); *G06F 2200/1633* (2013.01)

(58) Field of Classification Search
  USPC ...................................... 455/575.8
  See application file for complete search history.

(56) References Cited

U.S. PATENT DOCUMENTS

| | | | | |
|---|---|---|---|---|
| 8,875,879 | B2* | 11/2014 | Diebel | A45C 11/00 206/320 |
| 8,960,421 | B1* | 2/2015 | Diebel | G06F 1/1679 206/320 |
| 9,047,061 | B2 | 6/2015 | Ahee et al. | |
| 9,049,911 | B1* | 6/2015 | Wood | A45C 11/00 |
| 2012/0224316 | A1* | 9/2012 | Shulenberger | G06F 1/1628 361/679.09 |
| 2012/0293953 | A1* | 11/2012 | Wu | F16M 11/10 361/679.56 |
| 2013/0016467 | A1* | 1/2013 | Ku | F16M 11/10 361/679.08 |
| 2013/0214661 | A1* | 8/2013 | McBroom | G06F 1/1667 312/325 |
| 2013/0235521 | A1* | 9/2013 | Burch | G06F 1/1635 361/679.48 |
| 2015/0065208 | A1* | 3/2015 | Balaji | H04M 1/04 455/575.8 |
| 2015/0108186 | A1* | 4/2015 | Law | G03B 17/568 224/191 |
| 2015/0122850 | A1* | 5/2015 | Quehl | A45C 11/00 224/191 |
| 2015/0188593 | A1* | 7/2015 | Hu | H04B 1/3888 455/575.8 |
| 2015/0192955 | A1* | 7/2015 | Fathollahi | G06F 1/1662 361/679.09 |
| 2015/0200699 | A1* | 7/2015 | Fathollahi | H04B 1/3888 455/575.8 |
| 2015/0236744 | A1* | 8/2015 | Su | H04B 1/3888 455/575.8 |
| 2015/0263776 | A1* | 9/2015 | Shyu | A45C 13/002 455/575.8 |

OTHER PUBLICATIONS

Nick Guy, "Review: Targus Versavu Rotating Case & Stand for iPad (3rd-Gen)," Apr. 30, 2012, http://www.ilounge.com/index.php/reviews/entry/targus-versavu-rotating-case-stand-for-ipad-3rd-gen/.

Nick Guy, "Review: Targus Versavu Keyboard and Case for iPad 2," Aug. 3, 2011, http://www.ilounge.com/index.php/reviews/entry/targus-versavu-keyboard-and-case-for-ipad-2/.

* cited by examiner

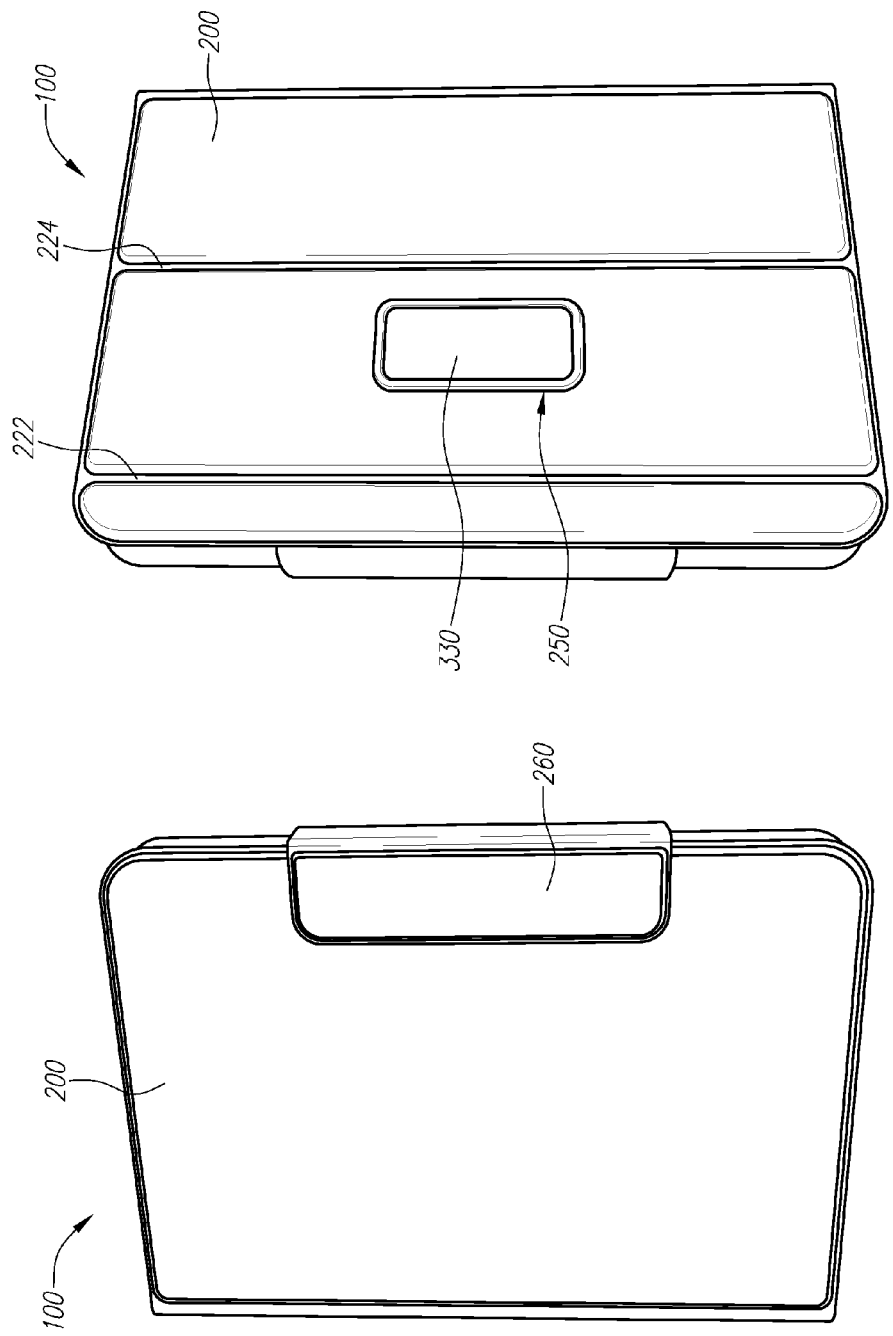

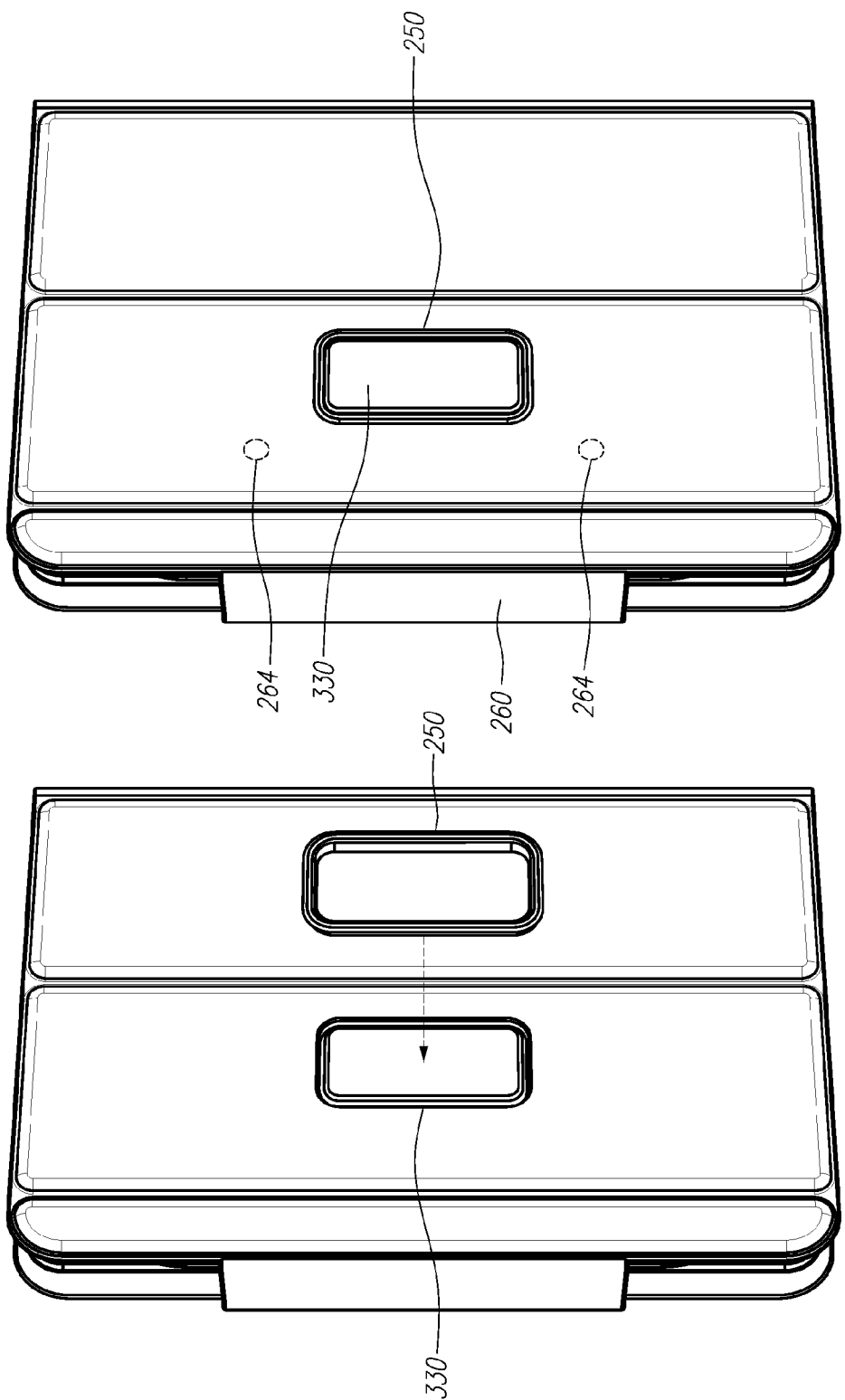

PROTECTIVE CASE FOR MOBILE DEVICE WITH INTEGRATED LATCH

INCORPORATION BY REFERENCE TO RELATED APPLICATIONS

This application is a continuation of U.S. application Ser. No. 14/590,975, filed Jan. 6, 2015, which claims the benefit of priority to U.S. Provisional Application No. 61/924,695, filed Jan. 7, 2014. Both of the above applications are hereby incorporated herein by reference in their entirety and are to be considered a part of this specification.

BACKGROUND

Field of the Invention

This patent document relates to protective cases for mobile or handheld electronic devices such as tablet computers, smart phones, gaming devices and the like.

Description of the Related Art

Protective cases for mobile devices are known art. There is a continuing need however to improve their construction and usability to enhance the user experience.

Accordingly, it is here recognized that there is a need for protective cases for mobile devices that include an integrated support latch that facilitates support of the device in a use position when the case is open and facilies a more secure closed position.

SUMMARY

There exists a continuing need for new and improved designs for cases for mobile devices that can provide high levels of protection and usability.

Various aspects of a uniquely design protective case for a mobile device are disclosed. The protective case includes a front cover and a relatively rigid shell, which together are configured to receive, retain, cover and protect the mobile device. The front cover includes multiple fold lines that extend across the cover and allow adjacent regions of the cover to rotate or move relative to each other. The shell is configured to receive and retain the mobile device while providing user access to the mobile device. The shell has an outer surface configured to include a latch with an integrated hook and magnets on opposing end regions of the front cover.

In operation, the latch hooks and retains one end section of the front cover to maintain the device in an angled use position when open. When in the fully closed position, the latch fits within an aperture defined within a back end region of the front cover. The aperture may be defined by a ring component that is dimensioned to receive the latch and firmly support the latch. The magnets incorporated into opposing ends of the front cover are provided to assist in maintaining the case in the fully closed position.

While various aspects are described above and in connection with the embodiments of the protective cases disclosed herein, including the drawings and claims, it should be understood that any of those aspects may be combined to form claims for a device, apparatus, system, methods of manufacture and/or use in any way without limitation.

BRIEF DESCRIPTION OF THE DRAWINGS

FIGS. 1A-1B are front and back face perspective views, respectively, of a protective case in the fully closed position in accordance with the teachings herein.

FIGS. 4A-4C are detailed illustrations of the latch ring and its placement in the front cover. FIG. 4A illustrates a perspective back view of the case in the open use position. FIG. 4B is a partially disassembled backside perspective view of the case in the fully closed position wherein the ring is disassembled from the front cover component. FIG. 4C is also a backside perspective view of the case in the fully closed position but further illustrates in shadow where the corresponding magnets may be located on the region of the front cover configured to mate with the flap when the case is in the fully closed position.

DETAILED DESCRIPTION OF THE PREFERRED EMBODIMENT

Figure 1C:
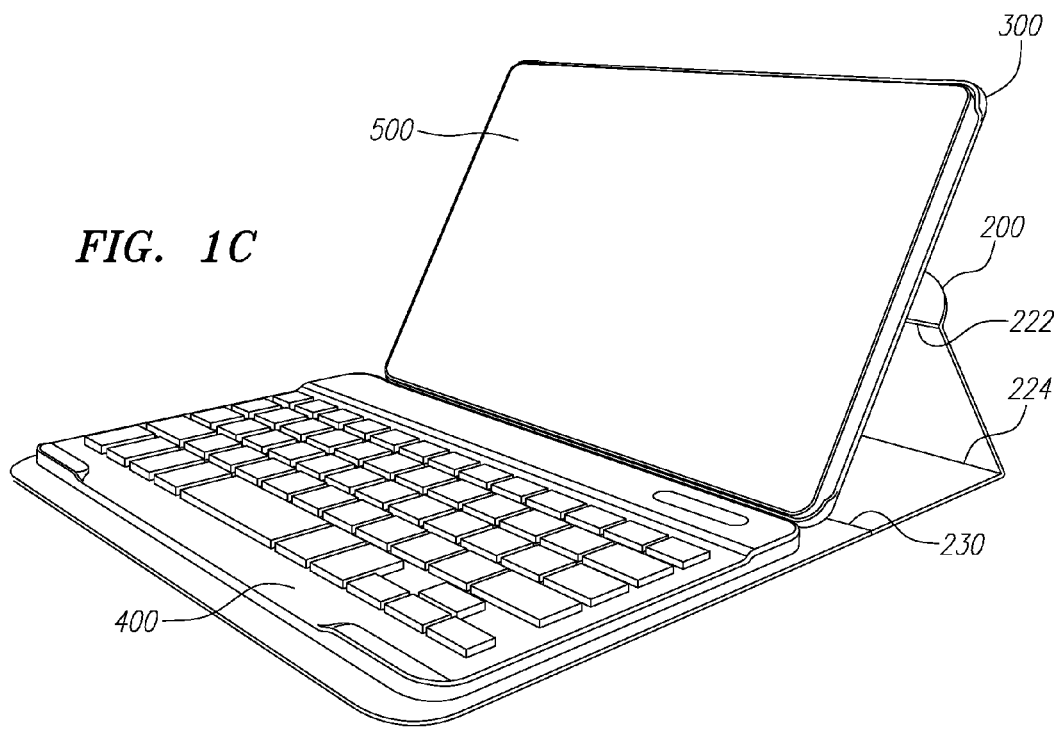
FIGS. 1C-1D are rear and front side perspective views, respectively, of the protective case illustrated in FIGS. 1A-1B, wherein the protective case is in an open use position to further illustrate the configuration and constriction of the constituent components and their operation.

Features, aspects and advantages are described below with reference to the drawings, which are intended to illustrate but not to limit the invention. In the drawings, like reference characters denote corresponding features consistently throughout similar embodiments. FIGS. 1-7 illustrate various aspects of a single embodiment of the protective case for a mobile device in the form of an Apple® iPad mini® tablet computer. (Apple and iPad mini are trademarks of Apple Inc.) It should be understood, however, that the various aspects and teachings therein are not limited to any particular mobile device and have wide applicability.

Figure 1D:
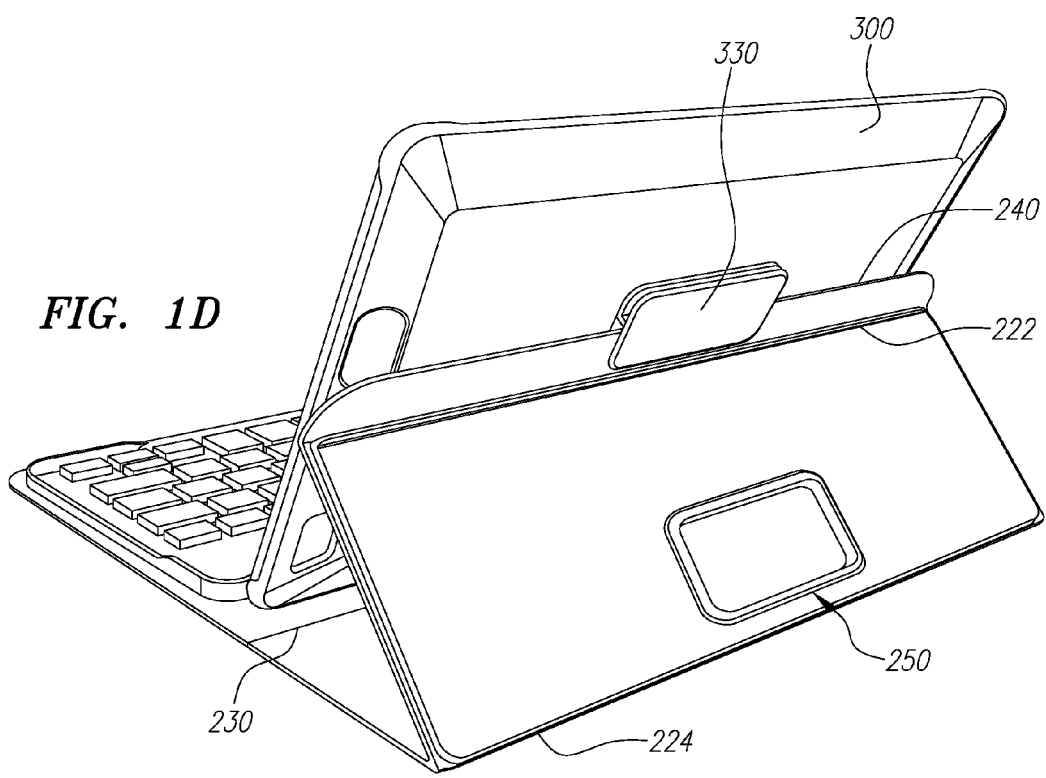

FIGS. 1A-1B are front and back face perspective views, respectively, of the protective case in the fully closed position. The protective case 100 includes a front cover component 200 and a shell component 300, which together are configured to receive, retain, cover and protect an Apple iPad mini tablet computer. The shell component 300 is mostly concealed within the front cover 200 when the case is in a fully closed position. FIGS. 1C-1D are rear and front side perspective views, respectively, of the protective case 100 in an open use position that further illustrate the configuration and construction of the constituent components and their operation.

The front cover 200 includes multiple fold lines 222, 224 that extend across the cover and allow adjacent regions of the cover to rotate along those lines. The front cover 200 may be made of one or more layers of natural or synthetic fabric, such that an outer layer may be comprised of a polyurethane fabric and internal layer may be comprised of a micro-suede fabric.

The shell component 300 is configured to receive and retain the tablet device while providing user access via apertures to the various control buttons (e.g., power, volume etc.) and ports (e.g., headphone jacks, data and charging ports etc.). The shell component 300 may be made of molded polycarbonate panel or wall. The shell component 300 has an inner surface 310 configured to receive and retain the tablet and an outer surface 320 configured to include a latch 330 with an integrated hook 340. When in operation, the latch hooks and retains an end section 240 of the front cover to maintain the device in an angled use position as best illustrated in FIGS. 1C-1D.

Figure 2B:
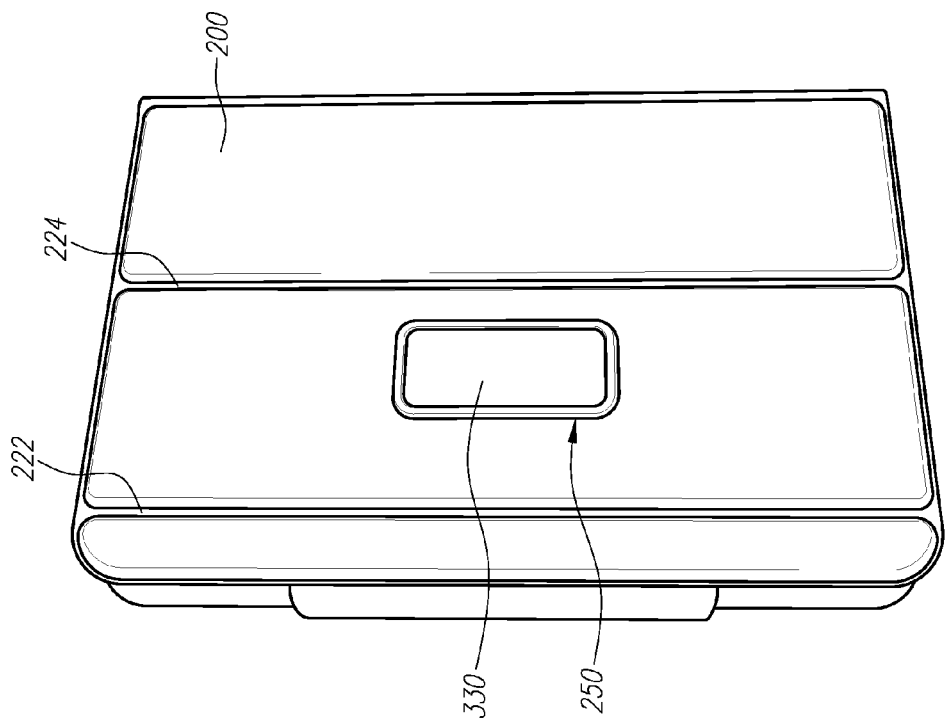
FIGS. 2A-2B are more detailed illustrations of the front and back face perspective views shown in FIGS. 1A-1B, respectively, of the protective case in the fully closed position.
Figure 2A:
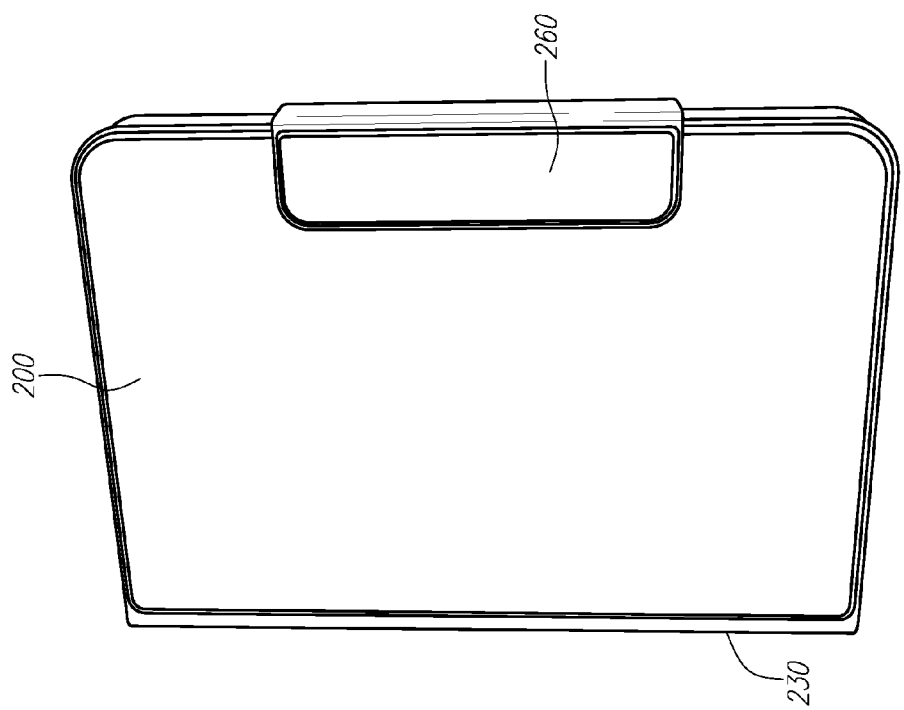

FIGS. 2A-2B are more detailed illustrations of the front and back face perspective views shown in FIGS. 1A-1B, respectively, of the protective case 100 in the fully closed position. The illustration depicts in more detail the ring 250 that defines an aperture 252 with the front cover 200 and the latch 330 that is dimensioned to fit snugly within the ring 250 when the case is in the fully closed position. The latch 330 also provides a hook 340 that engages an end section 240 of the front cover 200 in the open position to facilitate support of the device at an angled position while in use.

Figure 3:
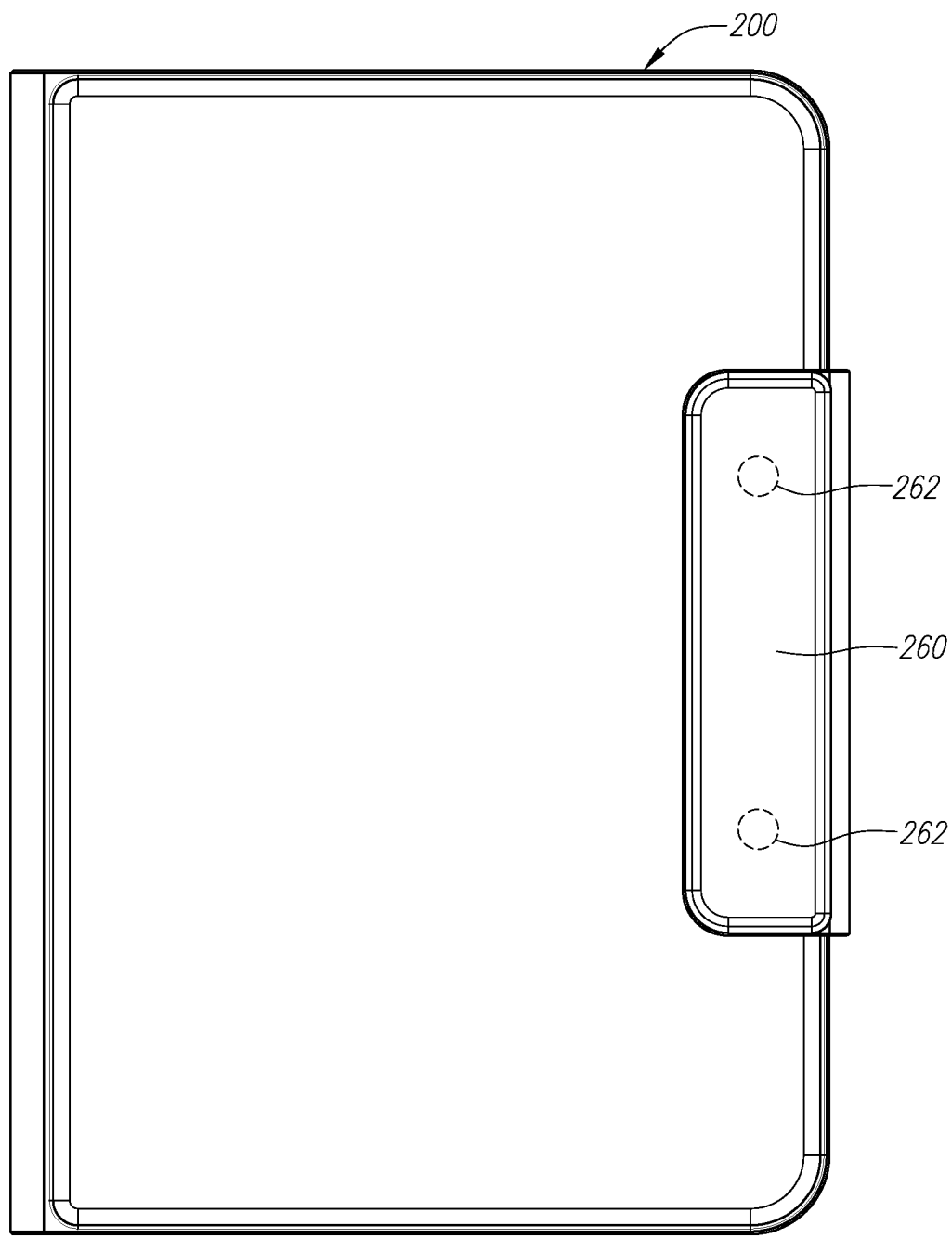
FIG. 3 is a front face view of the protective case in the fully closed position.

FIG. 3 is a front face view of the protective case 100 in the fully closed position showing location of magnets 262 on a flap 260 that extends from one end of the front cover to magnetically attach to another end of the front cover. The flap 260 may extend from either or both sides of the front cover 200 of the protective case and magnetically attach to the other end of the front cover. In the illustrated embodiment the flap 260 extends from the back end and when closed flaps-over the front end of the cover 200.

Corresponding magnets 262 with reverse or opposite polarization may be positioned in corresponding positions on the front cover underlying the flap 260 when the flap is in the closed position.

Figure 4A:
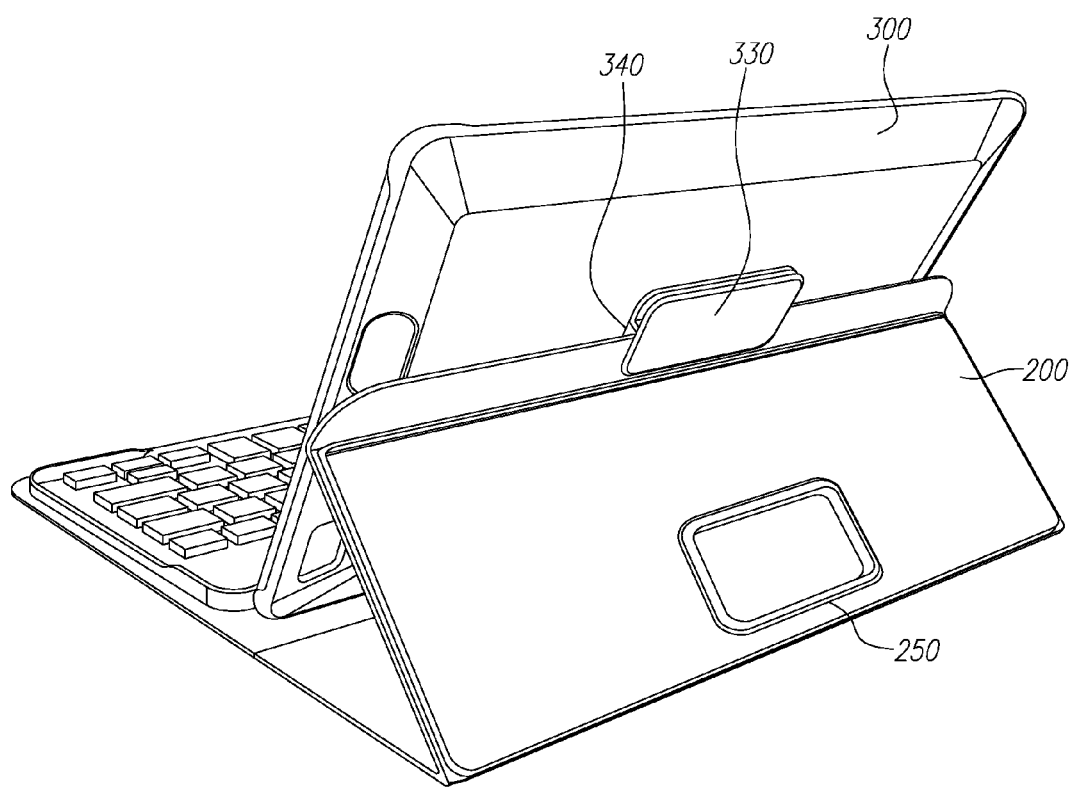

FIGS. 4A-4C are detailed illustration of the latch ring 250 and its placement in the front cover 200 so as to be configured to receive the latch 330 on the back side 320 of the shell component 330 when the case 100 is in the fully closed position. FIG. 4A illustrates a perspective back view of the case in the open use angled stand position with the end section 240 of the front cover 200 secured under the hook 340 that is integrated in the latch 330 formed on the back side 320 of the shell component 300. FIG. 4B is a partially disassembled backside perspective view of the fully closed case wherein the ring 250 is disassembled from the front cover component 200. FIG. 4C illustrates in phantom where the corresponding magnets 264 may be located on the region of the front cover 200 configured to mate with the flap 260 when the case is in the fully closed position.

The ring 250 provides firm support to the latch 330 to mitigate relative movement of the case components to further facilitate secured and maintained protection when the case is in the closed position.

Figure 5:
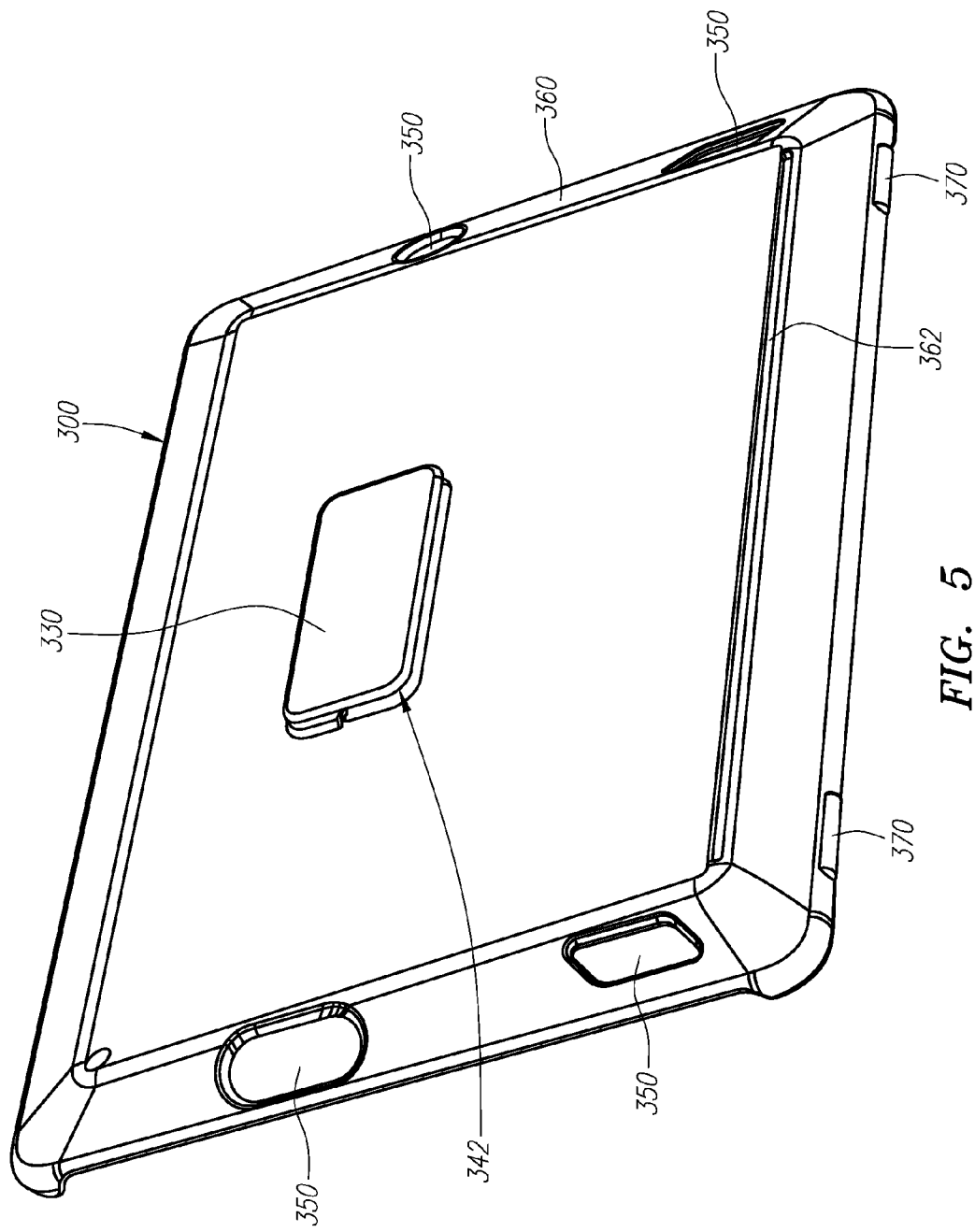
FIG. 5 is a detailed back side perspective view illustration of the shell component.

FIG. 5 is a detailed back side perspective view illustration of the shell component 300. As illustrated therein the latch 330, which is located generally centrally on the back side 320 of the shell 300 includes a slot 342 formed on its underside that creates a hook 340 configured to receive one end section 240 of the front cover 200.

Figure 6A:
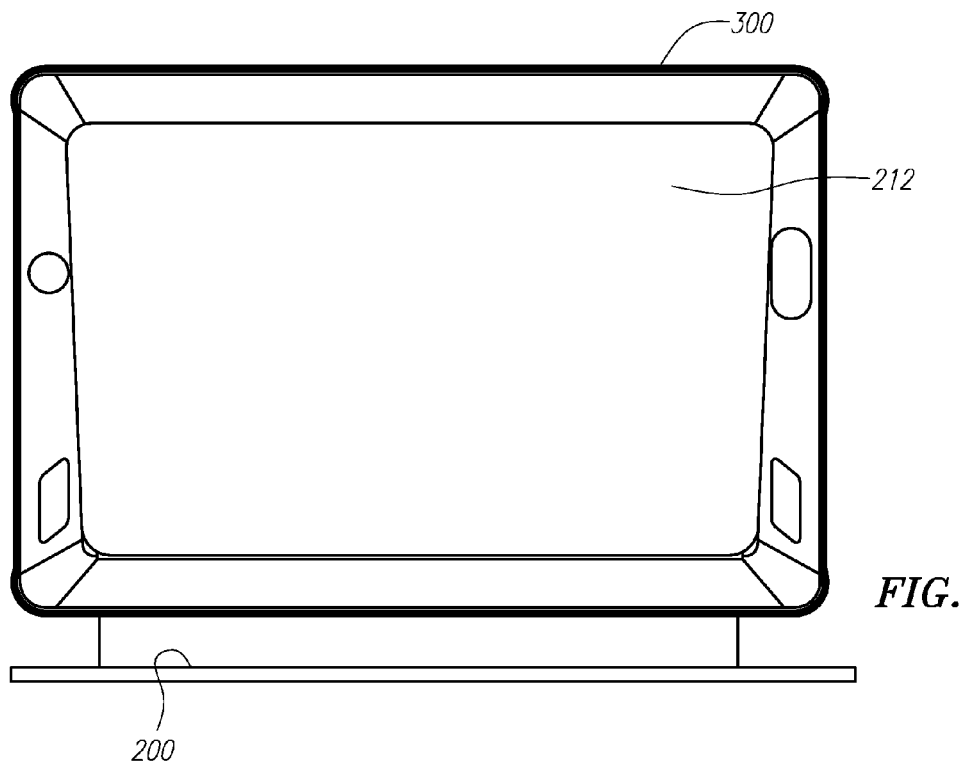
FIGS. 6A-6B are simplistic illustration of front and perspective views of the case components positioned in the open position with the front cover liner component being threaded into a slot in the shell component but not attached thereto.
Figure 6B:
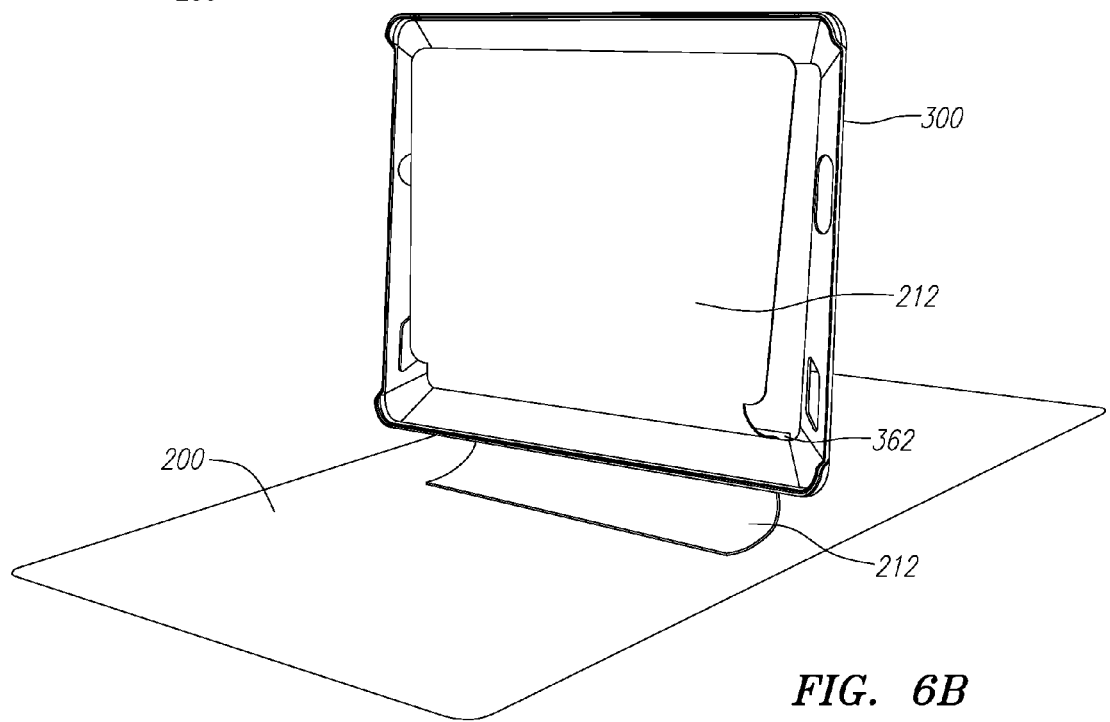

Also illustrated is another longitudinally extending slot 362 formed on the bottom section 360 of the shell for insertion of a fabric layer 212 extending from the inner surface 210 of the front cover 200 as illustrated in more detail in FIGS. 6A-6B.

Additionally illustrated are various apertures 350 to facilitate control and use of the device and rubber feet 370 to provide a relatively high friction surface that is capable of engaging the inner surface 210 of the front cover 200 or the top of the keyboard 400 while mitigating slippage there between.

FIGS. 6A and 6B are simplistic illustrations of front and perspective views of the case in the open position illustrating how the fabric liner component 212, extending from the front cover 200 and is fed through the fabric liner slot 362 formed in the bottom region 360 of the shell 300 from the back side 320 of the shell for mounting onto the front face 310 of the panel that forms the shell component 300 and thereby attaches the shell 300 to the front cover 200.

The fabric liner component 212 may be formed of any suitable material and be heat sealed to the other components of the front cover 200 and/or shell 300 and/or may be adhesively or mechanically attached thereto. The fabric liner component 212 in the preferred embodiment is flexible to allow for movement of the shell 300 relative to the front cover 200.

Figure 7:
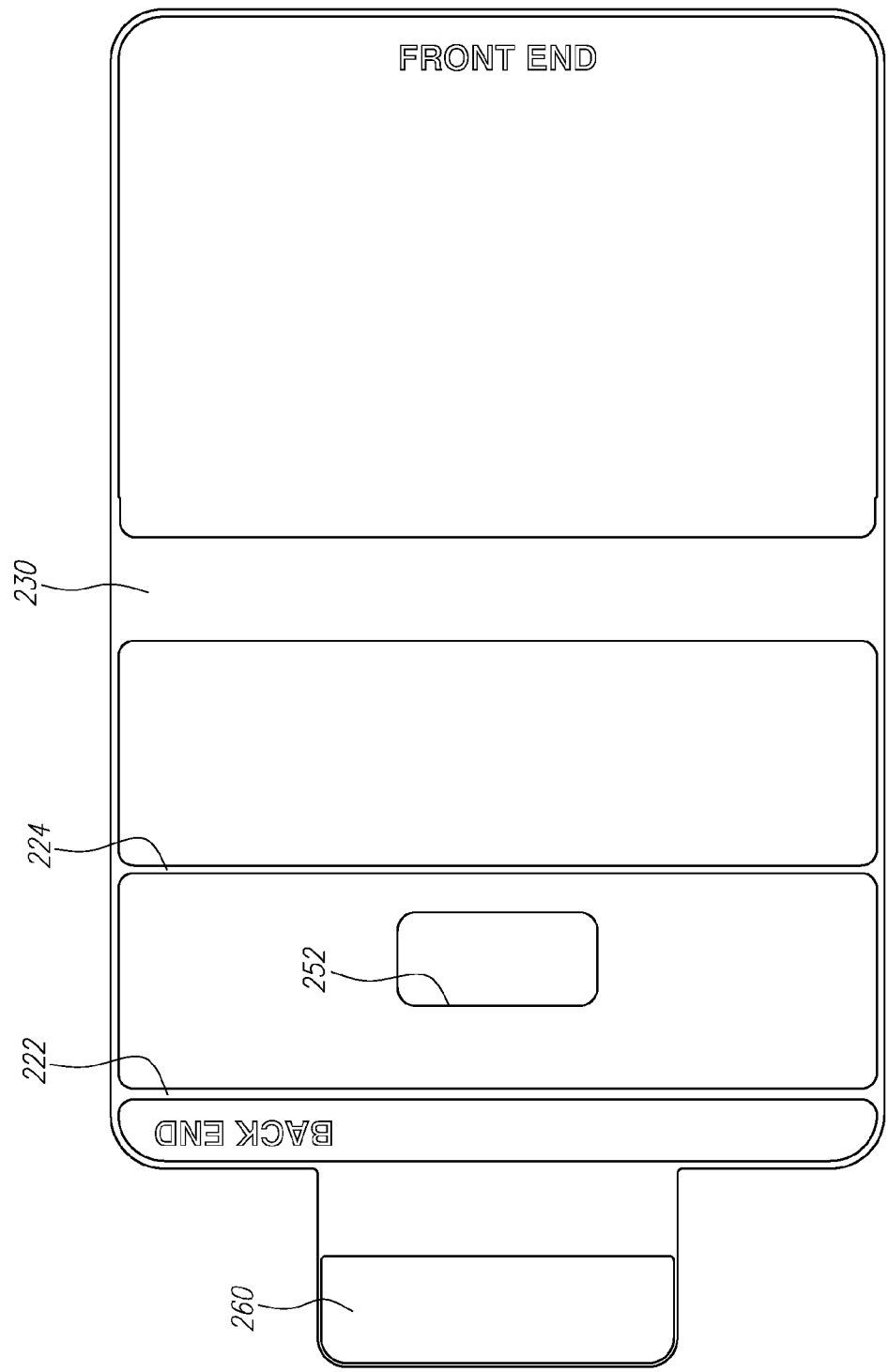
FIG. 7 is a plan view of the external face of the front cover illustrating the layout thereof.

FIG. 7 is a line drawing illustrating the fabric layout of the front cover 200 of the case 100 including the flap 260, the various fold lines 222, 224 and flexible joint or living joint 230, and the latch aperture 252 dimensioned to receive and retain latch ring 250.

Although various aspects are herein disclosed in the context of certain preferred embodiments, implementations, and examples, it will be understood by those skilled in the art that the present invention extends beyond the specifically disclosed embodiments to other alternative embodiments and/or uses of the inventive aspects and obvious modifications and equivalents thereof. In addition, while a number of variations of the aspects have been noted, other modifications, which are within their scope, will be readily apparent to those of skill in the art based upon this disclosure. It should be also understood that the scope of this disclosure includes the various combinations or sub-combinations of the specific features and aspects of the embodiments disclosed herein, such that the various features, modes of implementation and operation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A protective case for an electronic device comprising:
   a shell configured to receive and retain the electronic device, said shell comprising a back wall including an inner surface and an outer surface, the inner surface configured to cover at least a portion of a rear face of the electronic device, the shell further comprising a slot formed through the shell and a latch extending from the outer surface, the latch comprising an integrated hook;
   an outer cover including:
      a front region configured to cover a front face of the tablet device, the front region including a front panel and a keyboard;

a back region configured to cover the outer surface of the back wall when the case is in a fully closed position, the back region including a second fold line separating the first back panel from a second back panel and a third fold line separating the second back panel from the third back panel, the second back panel comprising an aperture defined by a ring dimensioned and positioned to receive the latch when the case is in the fully closed position, the third back panel being configured to be received by the integrated hook to support the electronic device in an angled use position; and a first fold line between the front region and the back region; and a continuous fabric connector including a liner portion attached to the inner surface of the back wall and a connector portion passing through the slot to attach to the inner surface of the outer cover, the continuous fabric connector being configured to connect an edge of the shell to the inner surface of the outer cover between the front region and the back region and to allow for movement of the edge of the shell relative to the outer cover.

2. The protective case of claim 1, further comprising a first set of magnets concealed within a flap configured to magnetically attach to a second set of magnets with opposite polarization concealed within the outer cover to attach the back region to the front region and maintain the outer cover in a fully closed position.

3. A protective case for an electronic device comprising:
a shell configured to receive and retain the electronic device, said shell comprising a back wall including an inner surface and an outer surface, the inner surface configured to cover at least a portion of a rear face of the electronic device, the shell further comprising a slot formed through the shell and a latch extending from the outer surface, the latch comprising an integrated hook configured to receive an end of the back region to support the electronic device in an angled use position;
an outer cover including:
a front region configured to cover a front face of the tablet device, the front region including a front panel;
a back region configured to cover the outer surface of the back wall when the case is in a fully closed position, the back region including a first back panel separated from a second back panel by a second fold line; and
a first fold line between the front region and the back region; and
a connector configured to connect an edge of the shell to the inner surface of the outer cover between the front region and the back region.

4. The protective case of claim 3, wherein the connector comprises a continuous fabric connector including a liner portion attached to the inner surface of the back wall.

5. The protective case of claim 4, wherein the connector further comprises a connector portion passing through the slot to attach to the inner surface of the outer cover.

6. The protective case of claim 5, wherein the connector portion is made of a flexible material to allow for movement of the edge of the shell relative to the outer cover.

7. The protective case of claim 5, wherein the connector portion is heat sealed to the outer cover.

8. The protective case of claim 3, wherein the back region further comprises an aperture defined by a ring dimensioned and positioned to receive the latch when the case is in the fully closed position.

9. The protective case of claim 3, wherein the back region further comprises a third fold line separating the second back panel from a third back panel, an end of the third back panel being configured to be received by the integrated hook.

10. The protective case of claim 9, wherein the back region further comprises an aperture defined by a ring, the aperture dimensioned and positioned to receive the latch when the case is in a fully closed position.

11. The protective case of claim 3, wherein the first back panel and the second back panel form an acute angle when an end of the back region is received in the integrated hook.

12. The protective case of claim 3, further comprising a flap configured to magnetically attach the back region to the front region when the outer cover is in a fully closed position.

13. The protective case of claim 12, further comprising a first set of magnets concealed within the flap and a second set of magnets concealed within the outer cover to maintain the case in the fully closed position.

14. The protective case of claim 13, wherein said first set of magnets has opposite polarization from said second set of magnets.

15. The protective case of claim 3, wherein said front region includes a keyboard.

16. The protective case of claim 3, wherein the outer cover comprises a first layer and a second layer.

17. The protective case of claim 16, wherein the first layer of the outer cover comprises a polyurethane fabric and the second layer comprises a micro-suede fabric.

18. The protective case of claim 3, wherein the shell further comprises rubber feet configured to provide a relatively high friction surface capable of engaging the outer cover.

* * * * *